Jan. 11, 1927.  
J. F. O'DONNELL  
KETTLE INSERT  
Filed March 21, 1925  
1,613,671

INVENTOR  
John F. O'Donnell,  
BY Henry J. Lucke  
ATTORNEY.

Patented Jan. 11, 1927.

1,613,671

UNITED STATES PATENT OFFICE.

JOHN F. O'DONNELL, OF MORRIS RUN, PENNSYLVANIA.

KETTLE INSERT.

Application filed March 21, 1925. Serial No. 17,365.

This invention relates to an insert saucepan or kettle for cooking and similar purposes.

An object of my invention is to provide an improved construction for saucepan or kettle to be inserted within a regulation or other approved form of saucepan or kettle and provided with suitable means for suspending the insert saucepan or kettle within the outer saucepan or kettle in proper heating relation therewith.

Another object of my invention is to devise a suspending means for attaining variable degree of suspension of the insert saucepan or kettle.

A further object of my invention is to provide an improved form of handle in combination with the suspending means to afford ready and convenient manipulation of the insert saucepan or kettle.

Further features and objects of the invention will be more fully understood from the following detail description and the accompanying drawings, in which—

Figure 1:
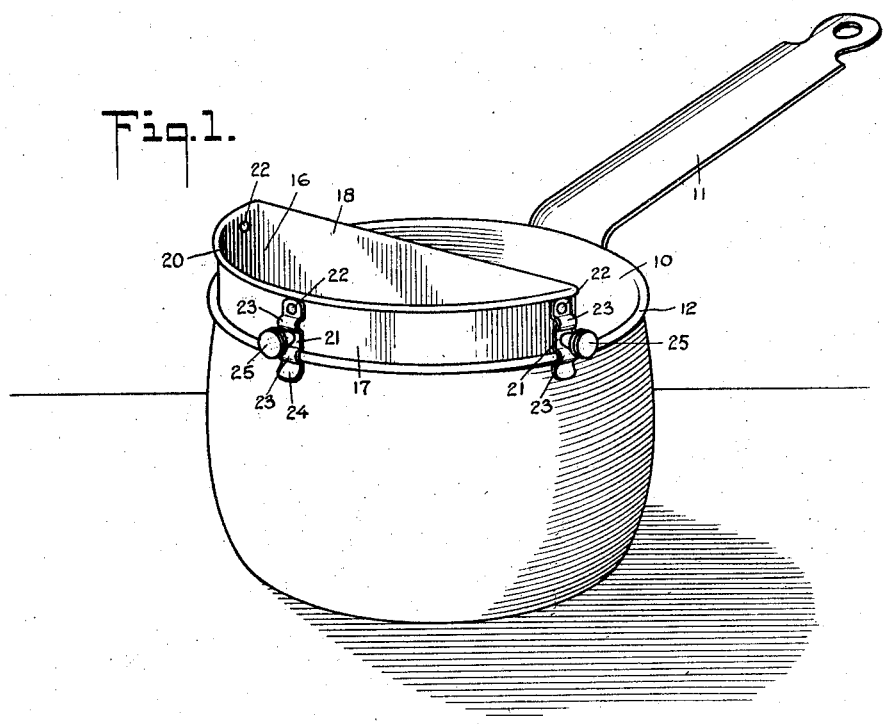
Figure 2:
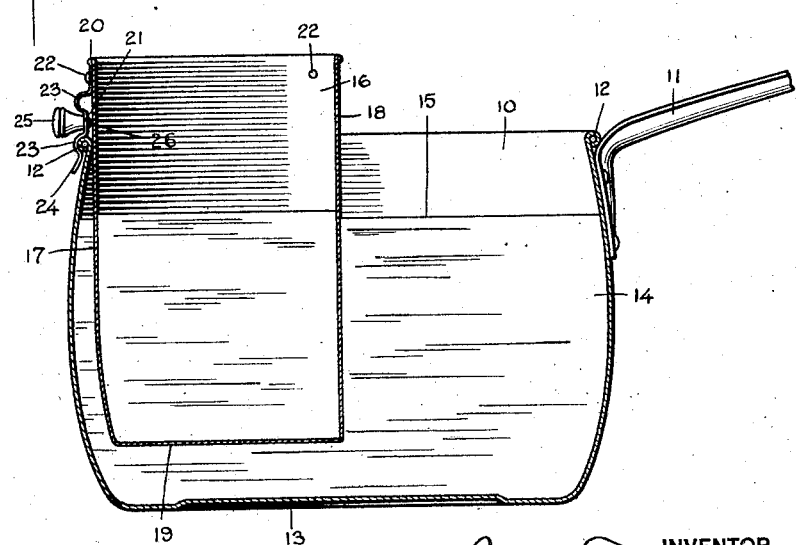

Fig. 1 is a top perspective view showing a preferred form of my insert saucepan or kettle and combined suspension and handle means, positioned within an ordinary saucepan; and Fig. 2 is a vertical, central sectional elevation of Fig. 1.

Referring to the drawings, the saucepan 10 is of the regulation construction or may be of any approved form. The handle of the saucepan 10 is indicated at 11 and its beaded rim at 12. The bottom 13 of the saucepan 10 is indicated at 13 and may be dished in as illustrated or otherwise. The level of the water 14 in the saucepan 10 is indicated at 15.

One form of my insert saucepan or kettle 16 is shown of substantially semi-circular contour, including the substantially circular wall 17 and the substantially flat wall 18. The bottom 19 may be flat or inwardly or outwardly pressed as may be desired. Usually, the upper rim 20 of the circular wall 17 and straight wall 18 is beaded.

The height of the insert is selected as preferred and it is within my invention to form the insert saucepan or kettle of different heights for proper assembly with regulation of saucepans of different heights now on the market.

In combination with my insert saucepan or kettle 16, I provide suitable means for suspension of the same within the regulation or other saucepan 10, and preferably for variable degree of suspension. One form of such suspension means is illustrated in the drawings and preferably two or more such suspension means are provided for each insert saucepan or kettle 16. In the drawings, I have indicated three suspension means 21 located respectively at the center of the circular wall 17 and closely proximate the two locations of intersection of the circular wall 17 with the straight wall 18, which suspension means 21 may be secured by rivets 22 or equivalent. Each such rivet 22 may pass through an opening adjacent the upper end of its suspension means 21 and pass through a suitable opening in the circular wall 17 closely adjacent its rim 20.

Each suspension means 21 may be formed of suitable spring metal and pressed to provide two or more outward bends 23, suitably curved or otherwise shaped to receive and retain a portion of the rim 12 of the saucepan 10. In Figs. 1 and 2, I have indicated the insert kettle or saucepan 16 suspended by means of the lower bends of the three suspension means 21, whereby the insert saucepan or kettle 16 is suspended within the saucepan 10 at a relatively greater height. It will be apparent that the insert saucepan 16 may be suspended in like manner at a relatively greater insertion within the saucepan 10 by means of the upper bends 23 of the respective suspension means 21.

In a manner, each suspension means 21 functions as a clip. Spring brass is a suitable material for my clip 21. The brass material may be nickel plated or a coating of tin may be applied to the spring material, the lower portion 24 of each suspension means 21 is preferably outwardly flared, as indicated in the drawings, to facilitate the positioning of the suspension means 21 about the rim 12 of the saucepan 10.

Combined with my suspension means 21 is the handle 25. Preferably each suspension means 21 is provided with a handle 25. Such handle 25 is preferably of non-heat-conducting material such as wood and secured to its suspension clip 21 by means of a rivet, headed pin 26 or the like.

The use of my invention will be understood from the foregoing detail description.

Upon placing the desired quantity of water 27 for boiling the food in the insert saucepan 16, the saucepan 16 is positioned to the desired degree of insertion within the saucepan 10, thus locating the lower portion of the insert saucepan 16 below the level 15 of the water 14 in the saucepan 16. When but one insert saucepan 16 is employed, the water 14 in the saucepan 14 may be employed to cook food placed therein, which is advantageous in cooking two different foods at one time over a single flame.

Two insert saucepans 16 may be similarly employed within a single outer saucepan 10 for separately cooking foods in such insert saucepans 16.

The shape of my insert saucepan 16 may be suitably conformed for the simultaneous insertion of three or more of such insert saucepan within any outer saucepan or other cooking utensil.

It will be noted that each handle 25 is secured to the suspension member 21 at a location intermediate its ends and preferably between the two bends 23 thereof, thereby facilitating the positioning of the suspension member 21 about the rim 12 of the outer saucepan 10 at either of the bends 23 as may be desired.

Whereas, I have described my invention by reference to specific forms thereof, it will be understood that many changes and modifications may be made without departing from the spirit of the invention.

I claim:

1. An insert saucepan for suspension within a regulation saucepan or other cooking vessel, comprising a body portion of reduced cross-section as compared with that of the cooking vessel, and a member formed of spring material secured at its one end to said body portion to project freely therefrom and having a plurality of bends for respectively receiving and retaining thereat the rim of the cooking vessel, thereby positioning the insert saucepan at varying heights within the cooking vessel.

2. An insert saucepan for suspension within a regulation saucepan or other cooking vessel, comprising a body portion of reduced cross-section as compared with that of the cooking vessel, a member formed of spring material and having a plurality of bends for receiving and retaining the rim of the cooking vessel, means for securing said clip at its one end to the body portion of said insert saucepan and a handle secured to said clip at an intermediate portion thereof.

3. An insert saucepan for suspension within a regulation saucepan or other cooking vessel, comprising a body portion of reduced cross-section as compared with that of the cooking vessel, a member formed of spring material and having a plurality of bends for receiving and retaining the rim of the cooking vessel, means for securing said clip at its one end to the body portion of said insert saucepan and a handle secured to said clip at a location between two of said bends.

In testimony whereof I have signed this specification this 10th day of March 1925.

JOHN F. O'DONNELL.